HIGH FREQUENCY MAGNETIC ELEMENTS AND TELECOMMUNICATION CIRCUITS

Filed Dec. 29, 1951 2 Sheets-Sheet 1

HIGH FREQUENCY MAGNETIC ELEMENTS AND TELECOMMUNICATION CIRCUITS

Filed Dec. 29, 1951

2 Sheets-Sheet 2

Patented Dec. 20, 1955

2,727,945

HIGH FREQUENCY MAGNETIC ELEMENTS AND TELECOMMUNICATION CIRCUITS

Marie Pierre Prache, Versailles, France, assignor to Lignes Telegraphiques & Telephoniques, a corporation of France Application December 29, 1951, Serial No. 264,206

Claims priority, application France January 31, 1951

2 Claims. (Cl. 178—45)

The present invention has, as an object, magnetic circuit elements in the shape of thin cylindrical shells hereinafter referred to as "magnetic shells," their method of manufacture and the application of these shells to telecommunication circuits.

While the magnetic shells which comprise the object of the present invention could be employed in any case where it is desirable to provide magnetic circuit elements which are to be employed in high frequency fields, their geometrical shape renders them more particularly adapted to employment in connection with electric circuits, the lines of magnetic force of which have approximately circular shapes, as it is the case of the lines of magnetic force associated with any long cylindrical conductor, or of those of a ring coil wound on an elongated mandrel of rectangular cross-section.

Thus, without limiting the scope of the present invention to its application to transmission lines for telecommunication circuits, its description will be given more partcularly referring to this particular case.

The advantages of the present invention will appear from the description of its applications.

It is well known that the continuous loading of telecommunication circuits, or "Krarup loading," has been previously effected by direct winding of magnetic metal tapes or wires around the conductors of the circuits. This type of loading has numerous disadvantages which render the employment of such loading practically impossible in circuits carrying currents at frequencies above the voice frequencies.

It has been shown (F. Breisig-Theoretische Telegraphie-Vieweg und Sohn, Braunschweig 1910; U. Meyer—"Das magnetische Feld von Krarupdrahten"—Elektrische Nachrichtentechnik—Band 1, Heft 5, November 1924, pages 152 to 157; K. W. Wagner—"Ueber die Schraubenstruktur des Magnetfelde in Krarupleitern"—Elektrische Nachrichtentechnik—Band 1, Heft 5, November 1924, pages 157 to 159), that, in such a construction, the magnetic flux tends to follow the direction of the ferro-magnetic metal wires or strips. As a result, the induction field in the metal is substantially equal to the product of the magnetic permeability of the metal by the applied field, that is, in standardized MKS units, to $\mu I/(2\pi D)$, where I is the current in the conductor expressed in amperes, $\mu$ is the permeability of the metal and D the diameter, expressed in meters, on which the wires or strips are wound. This field is thus relatively high, which causes important eddy current losses which become prohibitive for the operation of the circuits by means of high frequency currents. Due to the high value of the magnetic induction field in the metal, hysteresis losses are also high, which is liable to cause non-linear distortion and, consequently excessive crosstalk between channels in multiple employment of the circuits by means of carrier currents of staggered frequencies.

According to the present invention, there are provided magnetic shells which may be rigid or flexible, which have the shape of cylindrical strips, the length of which, in the direction of the generatrices of their cylindrical surface, is substantially larger than the width and the width larger than the thickness, and which are comprised of lengths of very fine wires, having a diameter equal to or smaller than 0.04 mm., made of a ferro-magnetic metal, individually coated with an electrically insulating material, arranged in such a manner that their axes form with the generatrices of the said cylindrical external surface of the said strip an angle comprised between 50° and 90° and agglomerated together by means of an electrically insulating material.

As an application of the invention, continuous loading of a telecommunication circuit is effected by placing around its cylindrical conductors the above mentioned magnetic shells and arranging them in such a manner that their generatrices be parallel with those of the conductors. This method makes it possible to obtain a continuous loading, giving, for an equal circuit bulk, a much lower attenuation than that of the circuits realized heretofore, as the wires employed have much smaller transverse dimensions than those of the wires or strips previously employed, and consequently the eddy current losses are much less.

The employment of the shells renders it possible to decrease these losses in a still greater proportion by employing, for the loading of a conductor, several shells, each one of which covers only a portion of the periphery of the cross-section of the conductor, and leaving between these shells a small interval which will be hereinafter referred to as an "air gap." It has been shown (see, for instance, Prache and Cazenave—Mesure de la permeabilite et des pertes sur enchantillons droits—"Cables et Transmission," July 1950, pages 216 to 233), that, calling $s$ the ratio of the inductance of a conductor covered with a magnetic winding to that of the conductor covered with a similar winding in which an air gap has been added, the insertion of the air gap divides the resistance due to eddy current losses by $s^2$ and the resistance due to hysteresis losses by $s^3$.

Thus, by leaving air gaps between the shells, it is possible to decrease considerably the influence of the eddy current losses and especially the non-linear distortion and thus to increase the maximum possible frequency of operation of the circuits.

The air gaps may be practically provided by coating with a light varnish layer the cut edges of the shells or again by inserting between these shells one or more sheets of an insulating material such as paper, drawn polystyrol (styroflex) and the like.

One of the main advantages of the present invention is that, while retaining the favorable features of the construction of magnetic circuit elements by winding of thin magnetic wires, the existence of air gaps and the particular choice of the angle of winding of the wires with respect to the generatrices of the cylindrical surface of the strip obviate the disadvantages present in the conventional construction making use of continuous helicoidal magnetic winding. It is well known that, in the latter construction, the magnetic lines of force have a tendency to follow the direction of the wires in the windings, which is liable to cause undesirable losses, as explained above.

The present invention will now be more particularly described with reference to the accompanying drawings in which.

Figures 1, 2, 3, 4, 5, 6:
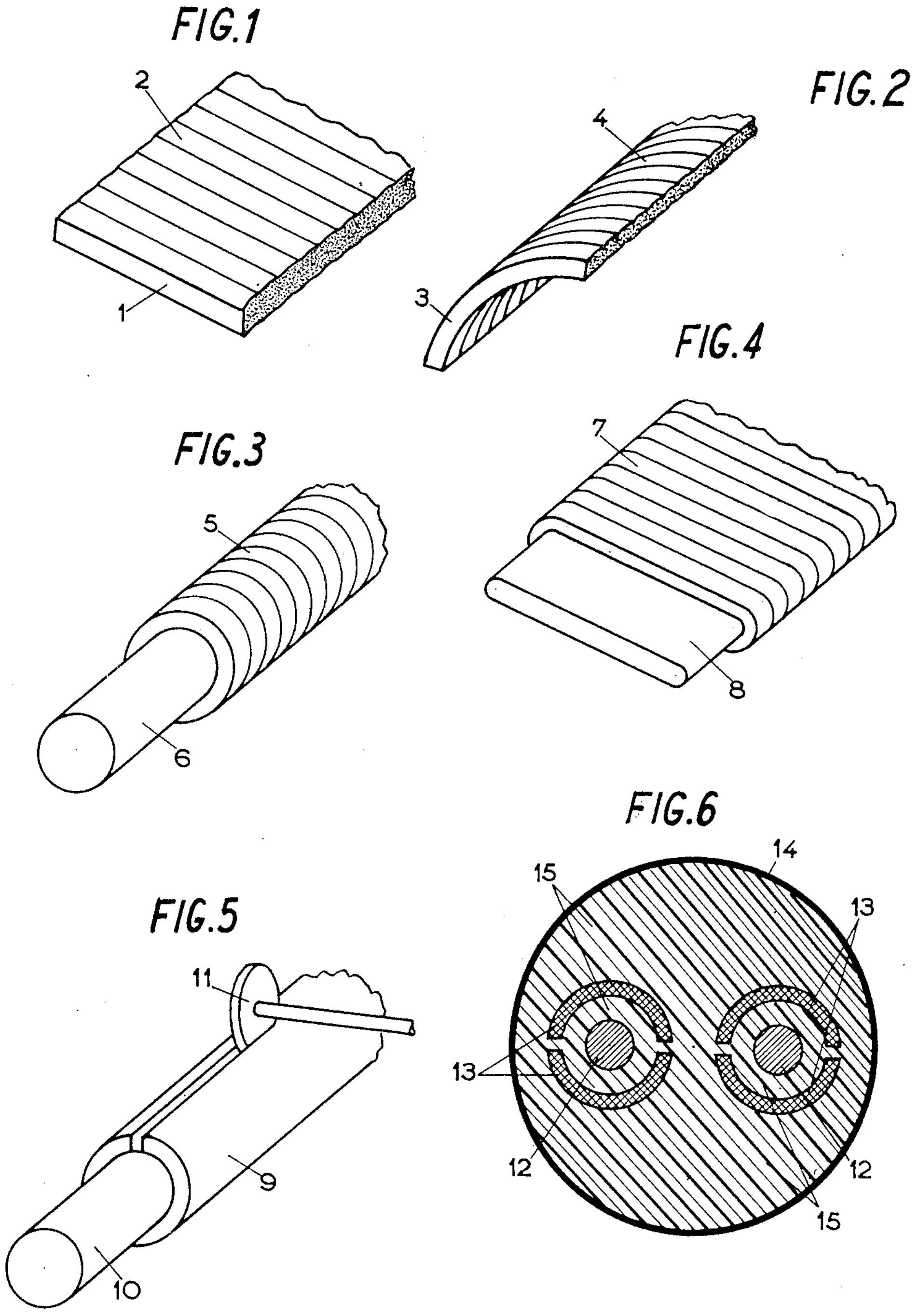
Figures 1 and 2 illustrate examples of magnetic shells according to the present invention.
Figures 3, 4 and 5 are relative to the manufacturing of the shells according to the present invention.
Figures 6, 7, 8, 9, 10, 11 and 12 illustrate examples of telecommunication circuits according to the present invention.

The cross-section of the shells and of the strips of which they are made may assume the shape of a rectangle, or it may have any shape resulting from the deformation of a rectangle by curving its longer sides, in the latter case, its longer sides may assume any shape, such as an arc of a circumference, an arc of an ellipse, a U, a V, etc. Figures 1 and 2 illustrate, by way of example, short lengths of magnetic shells according to the present invention; the shell of Figure 1 having a cross-section 1 having the shape of a rectangle and that of Figure 2, a cross-section 3 the two longer sides of which have the shape of an arc of a circumference; the magnetic shells manufactured according to the method described hereinafter may offer, as indicated in Figures 1 and 2, slightly undulating surfaces 2 and 4.

Another object of the present invention is a method for manufacturing these shells. Such manufacture is preferably effected by starting from a bundle of a large number of very fine wires, individually coated with an electrically insulating material. Such a bundle may be obtained for instance by the process described in the U. S. patent application Ser. No. 69,558, filed January 6, 1949 (Marie Pierre Prache). The bundle or bundles of fine wires are wound helically in one or more layers with their turns touching, on a cylindrical mandrel the cross-section of which has a shape adapted to that of the shells it is desired to obtain. By way of example, Figure 3 illustrates a bundle of fine wires 5, helically wound on a mandrel 6 of circular section and Figure 4 illustrates a bundle of fine wires 7, helically wound on a mandrel 8 the cross-section of which has the shape of a greatly elongated rectangle terminating in two semi-circles. If desired, there may be placed on the mandrel a cushion of a material softer than the material of which the mandrel consists; this is particularly advantageous in the case where the bundle wound on the mandrel has to be subsequently subjected to a high temperature heat treatment, in order to allow the free expansion of the metals during the said treatment. This cushion may be made of a material which disappears during the thermal treatment, such for example as a paper tape or a thin layer of an electrically insulating metal oxide or salt, such as magnesia, alumina, talcum, and the like. There may also be employed a cushion of textile fibres which will remain incorporated in the shell with a view to increasing its mechanical resistance. In case the wound bundle has to be subjected to a heat treatment, spun glass or silica may be employed in the form of braidings or pleatings. In the above-described process, the angle of the helical winding is, of course, more or less arbitrary. From the standpoint of the use of the magnetic shells, a very short path of winding, that is to say a winding with the wires almost perpendicular to the generatrices of the cylindrical mandrel, would be advisable. However, this is not always feasible and, in practice, the wires will be inclined by a certain angle to the said generatrices. It has been experimentally found that, from the point of view of the magnetic properties of the shells, no detrimental effect occurs provided the angle between the wires and the generatrices of the cylindrical surface of the shell be at least equal to 50 degrees.

If a heat treatment is necessary in order to give the wires in the bundles their optimum magnetic properties, the bundle wound on the mandrel is subjected to this treatment.

The wound bundles are then impregnated with the agglomerating substance. This may be effected by any one of the known processes, for instance, by coating, the bundles with a plastic material dissolved in a solvent, and evaporating the solvent, or by coating the bundles with a substance capable of being polymerized by heat and then heating them or again by passing the mandrel covered with the bundles in an extrusion machine charged with a plastic material.

If it is desired to obtain rigid shells, there may be employed, for the impregnating process, a thermosetting material such as polystyrol, formophenolic resins, or the like. If it is desired to obtain flexible shells, there may be employed, for the impregnating process, a plastic material having a certain flexibility, such for example as cellulose acetate, cellulose nitrate, vinylic resins, polyethylene, or the like, with a possible addition of a plasticizer.

Referring to Figure 5, there is illustrated a covering 9 of magnetic wires wound on a mandrel 10 and impregnated so as to form a solid body. The covering 9 is then cut down to the mandrel by means of a milling cutter or a fine grindstone 11, along two or more planes passing through generatrices of the cylindrical surface limiting the said body, which, depending on the shape of the mandrel, provides shells in the shape of flat, circular, elliptical strips, for example, by cutting the covering 5 illustrated in Figure 3 along several planes, shells are obtained in the shape of that illustrated in Figure 2 and by suppressing the rounded portions of the edges of the covering 7 illustrated in Figure 4, shells are obtained having a rectangular cross section, like that illustrated in Figure 1.

A further object of the present invention is the employment of the said magnetic shells for the "loading" or artifically increasing of the inductance of telecommunication circuits. This type of inductance increase will be designated hereinafter under its usual name of continuous loading but it should be understood clearly that it may be applied to the conductors in a discontinuous manner while still remaining within the scope of the present invention.

By way of example, a loaded symmetrical circuit including two circular section conductors such as the one illustrated in Figure 6 may be obtained as follows: Conductors 12 may be coated with a continuous layer of dielectric or again with dielectric elements serving as mechanical supports such as styroflex twine or polyethylene washers, giving to their outer diameter a value equal to that of the inner diameter of the shells. Two shells 13, the cross-section of which has the shape of a semi-circle, are then placed on each one of the conductors 12, or on said dielectric elements, leaving between them air gaps obtained as explained above, and possibly further covered with a flexible tape of dielectric such as styroflex. The assembly of the two conductors may then be covered with a continuous layer of dielectric which may be placed in a proper position by means of an extrusion machine or again covered with mechanical support elements such as dielectric twine or washers, the whole assembly being possibly further covered with a metal screen 14. In Figure 6, the dielectric is illustrated in the case in which it consists of continuous layers and it is indicated by 15 both around each conductor and around the two conductors and their shells; the same will hold in all the Figures 7 to 12.

Such a symmetrical circuit, loaded according to the present invention comprising two circular copper conductors 1.6 mm. in diameter, has been built experimentally. Each conductor was covered with two shells 0.5 mm. thick, the cross section of which is semi-circular having a radius of 1.5 mm., and formed of 0.018 mm. wires of an iron alloy with 40% nickel, these wires occupying 30% of the volume of the shells. These shells were separated by 0.08 mm. air gaps. This circuit showed an attenuation of 49 micro-nepers per meter at a frequency of 50 kc./s., and 81 micro-nepers at a frequency of 100 kc./s., while the attenuation per meter of a similar but unloaded circuit was 79 micro-nepers at 50 kc./s., and 112 micro-nepers at 100 kc./s. (one micro-neper=one millionth of a neper=8.68 millionth of a decibel).

A still further object of the present invention is the obtention of continuous loaded circuits for high frequencies, wherein one of the conductors surrounds the other conductor completely and which will be hereinafter referred to as coaxial circuits, and wherein the magnetic material employed for loading is placed in the space between the conductors.

Good results from such a construction were impossible to obtain with the previously known method of loading by helically wound wires or tapes as, in a circuit employing the said method of loading, the magnetic induction vector (as it has been explained hereinbefore), follows the direction of the winding helix for the wires or tapes, and thus includes a small "longitudinal" component parallel to the axis of the conductors. The outer conductor, closed on itself, behaves, as regards the corresponding "longitudinal flux," like a short circuited secondary turn in a transformer, that is, this flux induces currents which close by following paths located inside this conductor in a plane perpendicular to its axis. These transverse currents considerably increase the loss resistance introduced into the circuit and, in accordance with Lenz's law, they further create a counteracting flux which opposes the main flux and decreases the additional inductance provided by the loading.

In the loading method according to the present invention, the production of this "longitudinal flux" is avoided as follows:

A portion of the shells is manufactured by winding a bundle of wires around the mandrel along a right-handed helical curve, and another portion by winding a bundle along a left handed helical curve. The shells are then arranged around the central conductor of the circuit so that, on the periphery of a given section of the circuit, one finds shells from a right handed winding and shells from a left handed winding, such that, starting from a given point, the magnetic flux following the shells in the direction of the wires and crossing the air gaps perpendicularly to the axis of the conductors comes back to its starting point after having gone through a complete revolution around this conductor. If, for instance, the loading is effected by means of two shells having cross-sections of semi-circular shape of the same opening there will be placed, facing each other, a right handed shell and a left handed shell wound to the same pitch.

Figure 7:
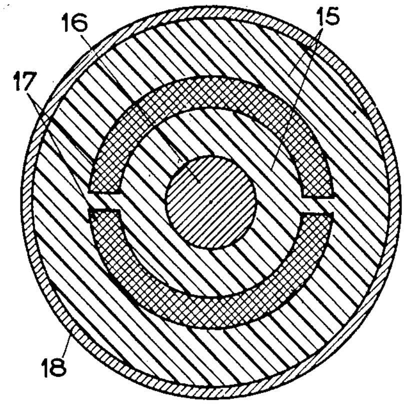
Figure 8:
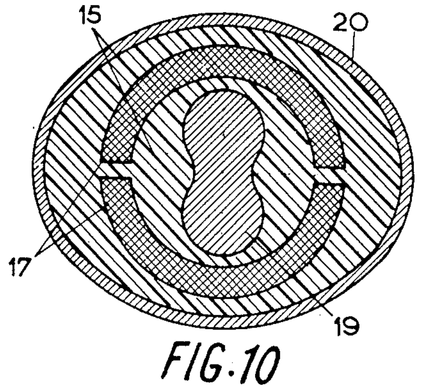

By way of example, a loaded coaxial circuit with circular cross-section conductors, illustrated in Figure 7, can be realized by placing, around a central conductor 16, magnetic shells 17 and a dielectric 15 by the method described hereinbefore for the case of a conductor belonging to a symmetrical circuit and by covering the whole with an outer conductor 18.

A circuit of this nature has been realized experimentally according to the present invention, by surrounding one of the 1.6 mm. conductors, loaded by shells, as described hereinbefore, by an outer conductor formed by a copper tube of 9.4 mm. This circuit showed an attenuation of 50 micro-nepers per meter at a frequency of 50 kc./s., and of 79 micro-nepers at a frequency of 100 kc./s., while the attenuation of a similar but unloaded circuit was 77 micro-nepers at 50 kc./s., and 115 micro-nepers at 100 kc./s.

Another advantage of the employment of continuous loading by magnetic shells manufactured in accordance with the present invention, is to facilitate the employment of high permeability magnetic materials such as iron-nickel, iron-nickel-molybdenum or iron-nickel-cobalt alloys and to even allow the employment of some of these alloys in cases where such employment was impossible heretofore. These alloys, it should be remembered, lose their magnetic qualities when they are subjected to a mechanical stress and recover them only by means of a suitable heat treatment. It is therefore necessary to subject them to this heat treatment after having given them their final shape, that is, in the process for continuous loading employed heretofore, after winding the magnetic metal wires or strips around the conductors, which, from a practical point of view, are always made of copper. This operation has great difficulties, as the thermal expansion coefficient of copper is much higher than that of the magnetic alloys, with the resultant that the magnetic metal wires or strips tend to enter the copper of the conductor, during heating, becoming partly welded thereto, and are then deformed during cooling, which is detrimental to their magnetic qualities. A number of methods have been proposed for overcoming this disadvantage but none of them is entirely satisfactory.

In addition, the heat treatment of the magnetic metal can be effected only at a temperature substantially lower than the melting temperature of copper; thus, in the case of some alloys such as those having a high nickel content, the optimum treatment temperature which reaches or exceeds 1000° C., the full magnetic qualities of the metal cannot be recovered.

The employment of the magnetic shells which are the object of the present invention overcomes this disadvantage since the final shape of the shells is given by winding the magnetic wires on a mandrel and as one may select for this mandrel a material having a high melting point and offering an expansion coefficient of the same order of magnitude as that of the magnetic wires.

Another possible application of the present invention is the manufacture of loaded telecommunication circuits wherein one at least of the conductors has a shape substantially different from the circular shape, that is, wherein the largest dimension of the cross-section of the said conductor is at least twice its smallest dimension. Such circuits are described in a more detailed manner in my copending U. S. patent application No. 264,207, filed December 29, 1951, now Patent No. 2,669,603.

It is well known that, due to the skin effect, high frequency currents in a conductor are propagated only through a very thin metal layer in the vicinity of its surface. If the linear current density along this surface is a constant one the apparent resistance of the conductor is then inversely proportional to the length of the periphery of its cross section.

From this standpoint, circular section conductors are the most unfavorable, since, for a given peripheral length they offer the largest cross-section area and consequently require the largest weight of metal for a given longitudinal resistance. Further, the existence of a relatively large amount of useless metal in the inner portion of the conductors increases the area of the cross section of the circuits and, consequently the amount of metal necessary for the manufacturing of the cable sheath which contains these circuits.

However, in the circuits realized heretofore, it was deemed necessary to employ conductors having a circular or almost circular section, since, on differently shaped conductors, the proximity effect concentrates the electric current in the regions of high curvature of the periphery of these conductors, which considerably increases their apparent resistance.

It is shown in text books and, for example, in the book "Electromagnetic Waves" by S. A. Schelkunoff (edited by Van Nostrand—New York, 1943) that at high frequencies the electric current density at the surface of the conductors may be represented by a vector perpendicular and equal (in M. K. S. units) in magnitude to the tangential component of the outside magnetic field in the immediate vicinity to this surface.

The employment of the magnetic shells which are the object of the present invention opens a way to new possibilities due to the fact that the insertion of shells in the circuit renders it possible to change at will the pattern of the magnetic lines of force. It will thus be possible to realize circuits having a small bulk, a small attenuation and a small weight of conducting metal by the insertion of magnetic shells in the circuit and determining the shapes of the conductors, the shapes of the shells and the mutual positions of the conductors and shells in such a manner that the tangential component of the magnetic field be as constant as possible over the whole periphery of the conductors.

For this determination, employment will be made of the fact that, due to the high permeability of the shells and to the presence of the air gaps, the magnetic field in the shells has the same direction as that of the largest dimension of their cross section and that its magnitude is always lower than $I/p$; I being the current in the conductor and $p$ the length of the periphery of the cross section of this conductor. On the other hand, thanks to the continuity of the tangential component of the magnetic field, the external magnetic field in the vicinity of the shell cannot exceed the above mentioned value. On the contrary the magnetic field is high in the whole region located in the vicinity of the air gaps between the shells.

Therefore, the shells will be arranged in such a manner that they be quite close to the conductors, that is, at most a few millimeters away from them, in the high curvature regions of these conductors, and their shape will be chosen such that they then gradually move away from the said conductors. In addition, air gaps will be provided between the shells and in regions far from the conductors. A more exact determination of the ordinary shapes of the conductors and shells, can be obtained by a cut and try process executed on short lengths of experimental circuits. This cut and try work can be carried by determining the pattern of the magnetic lines of force by calculation or by the known method using an electrolytic analogue.

A few types of circuits which can be realized according to the present invention are indicated hereinafter by way of non limitative examples.

In the example of Figure 7, the presence of the air gaps between the shells causes an increase of the magnetic field in the regions of the conductors near to the air gaps and, consequently, a concentration of the electric current in the portions of the conductors located nearest to these air gaps. One may overcome this disadvantage, without modifying the shape of the shells, or even convert it into an advantage, by modifying the shape of the conductors so as to move them away from the air gaps. In a coaxial circuit loaded by two shells of semi-circular section, for instance, it will be advantageous to replace the conductors of circular cross sections represented in Figure 7 by the conductors represented in Figure 8, the section of which offers, for the inner conductor 10, the shape of an 8 and for an outer conductor 20, an elliptical shape. By suitably selecting the contours of these two conductors, there is thus obtained, for a given bulk of the circuit, conductors having a longer periphery, that is, a lower effective resistance and, consequently, a circuit with a lower attenuation than a coaxial circuit with conductors of circular cross sections. In addition the amount of conducting metal necessary for the manufacture is less.

On the other hand it is known that the shape of conductors which at high frequencies allows the greatest saving in metal and consequently the greatest reduction in bulk, is that of thin tapes.

Such conductors, however, could not be employed heretofore because of the effect known as "proximity effect" which would have concentrated the current in the vicinity of the edges of the tape.

According to the present invention this drawback may be avoided by magnetically loading such conductors by means of shells, the cross-section of which has the shape of a V with a rounded bottom, and by arranging these shells in such a manner that the inner portion of the bottom of the V be in close vicinity to the edges of the tapes.

Figure 9:
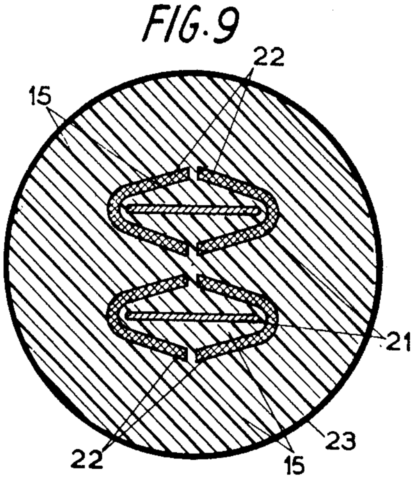
Figure 10:
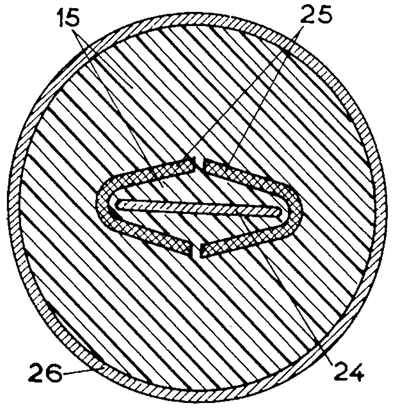

A loaded circuit with two conductors exterior to each other can thus be obtained, as illustrated in Figure 9, in which each one of conductors 21, in the shape of a tape, is loaded with two shells 22, the whole being possibly placed inside a conducting screen 23; a loaded coaxial circuit can also be realized as illustrated in Figure 10, in which an inner tape-shaped conductor 24 is loaded by two shells 25, the outer conductor being represented at 26.

The shells are held in position by insulating elements according to any one of the hereinbefore described methods.

The above examples relate to circuits in which the inductance increase caused by the load is relatively large. This increase causes a large decrease of the attenuation but it entails, as an unavoidable counter-part, a substantial reduction in the velocity of propagation of high frequency signals. In addition, to obtain this large inductance increase, the length of the air gaps have to be maintained at a fairly small value, so that the magnetic induction field in the shells, though much smaller than it would be if there was no air gap, is still fairly large, with the result that the eddy losses limit the maximum employment frequency of the circuits. By way of example, in a circuit the inner conductor of which has a circular cross-section and a diameter of 2 mm., loaded with shells 1 mm. thick, made of 0.012 mm. wires with air gaps 0.1 mm. wide, the maximum frequency at which a noticeable attenuation reduction can be obtained is of the order of 300 kc./s.

One may also, by means of the shells which are an object of the present invention, obtain circuits of a very high velocity of propagation and permitting the transmission of currents of frequencies up to several megacycles per second, that is, of the same order of magnitude as that corresponding to non-loaded coaxial circuits, but having as compared with the latter a smaller bulk and permits a saving in conductor metal. To this effect, conductors are employed in which the largest dimension of the cross section is at least twice the smallest dimension, the magnetic shells being then employed almost exclusively to decrease the high frequency resistance increase known as proximity effect. A very large clearance is then left between the shells so that they only slightly increase the circuit inductance and consequently decrease its velocity of propagation only in a small measure. The total reluctance of the magnetic circuit being then very large, the induction field inside the shells and consequently the eddy-current losses are small. Such a circuit can be operated up to a frequency at least equal to that where the skin effect begins to appear in the magnetic wires. For iron alloy wires with 40% nickel, for instance, this frequency is of the order of 2 megacycles per second if the shell is made of 0.018 mm. wires and 4 megacycles per second if the shell is made of 0.012 mm. wires.

Figure 11:
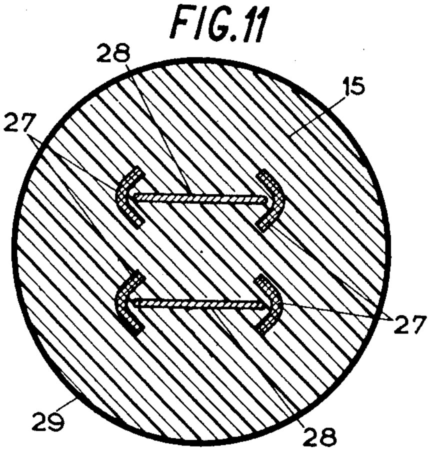
Figure 12:
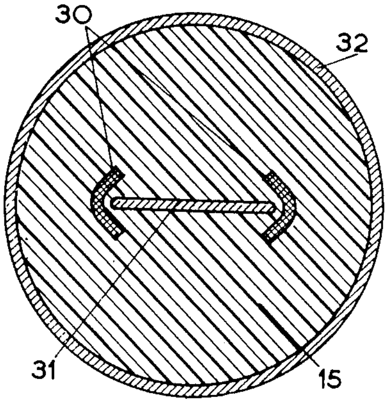

If the shape of the conductors is that of tapes, the circuit may be given the shape as illustrated in Figure 11 for a symmetrical balanced circuit, and the shape illustrated in Figure 12 for a coaxial circuit. In Figure 11 magnetic shells 27 are arranged at the ends of two tape-shaped conductors 28 of the symmetrical circuit and the whole may be set up inside a metal screen 29. In Figure 12, shells 30 are placed at the ends of an inner tape shaped conductor 31 of a coaxial circuit, the outer conductor of which is illustrated at 32.

What I claim is:

1. An inductively loaded telecommunication circuit including cylindrical conductors the loading of which is constituted by cylindrical magnetic circuit elements in the shape of a cylindrical strip adapted to constitute a closed magnetic circuit by assembling at least one of the said elements with at least one further similar element separated therefrom by dielectric gaps of small length, each of said elements comprising a very large number of lengths of wire of ferromagnetic material of a diameter at most equal to 0.04 millimeter, said lengths of wire being individually electrically insulated and arranged in such a manner that their axes are disposed relatively to the generatrices of the cylindrical external surface of the said strip at an angle comprised between 50 and 90 degrees and agglomerated together by an electrically insulating impregnation material; the said elements being arranged in such a manner that each of them partly surrounds the periphery of the cross-section of at least one of the said conductors and in such a manner that the generatrices of the external surface of the said elements are parallel to those of the conductors, and the said elements being separated from each other by the said dielectric gaps of small length.

2. An inductively loaded telecommunication circuit including cylindrical conductors, the loading of which is constituted by magnetic circuit elements in the shape of a cylindrical strip adapted to constitute a closed magnetic circuit by assembling at least one of the said elements with at least one further similar element separated therefrom by dielectric gaps of small length, each of said elements comprising a very large number of lengths of wire of ferromagnetic material of a diameter at most equal to 0.04 millimeter, said lengths of wire being individually electrically insulated and arranged in such a manner that their axes are disposed relatively to the generatrices of the cylindrical external surface of the said strip at an angle comprised between 50 and 90 degrees and agglomerated together by an electrically insulating impregnation material; and wherein the periphery of the cross-section of at least one of the said conductors is surrounded by a plurality of such magnetic elements comprising magnetic elements obtained by right handed helical winding of the wire, and magnetic elements obtained by left handed helical winding of the wire.

References Cited in the file of this patent

UNITED STATES PATENTS

| | | |
|---|---|---|
| 931,542 | Wohl et al. | Aug. 17, 1909 |
| 1,586,889 | Elmen | June 1, 1926 |
| 1,826,297 | Apple | Oct. 6, 1931 |
| 2,029,041 | Strieby | Jan. 28, 1936 |
| 2,228,797 | Wassermann | Jan. 14, 1941 |
| 2,228,798 | Wassermann | Jan. 14, 1941 |

FOREIGN PATENTS

| | | |
|---|---|---|
| 407,937 | Germany | Jan. 8, 1925 |